Patented Apr. 4, 1950

2,502,453

UNITED STATES PATENT OFFICE 2,502,453

PREPARATION OF BETA-(N,N-DIPHENYL)-AMINO PROPIONIC ACID

Thomas L. Gresham and Ralph A. Bankert, Akron, Ohio, assignors to The B. F. Goodrich Company, New York, N. Y., a corporation of New York No Drawing. Application January 2, 1947, Serial No. 719,916

3 Claims. (Cl. 260—518)

This invention relates to the preparation of beta-(N,N-diphenyl)-amino propionic acid, (also called beta-(N,N-diphenyl)-alanine), by the reaction of the organic compound, beta propiolactone, with the secondary diarylamine, diphenyl amine.

It is disclosed in U. S. Patent 2,356,459 to Frederich E. Küng that beta-lactones, that is, lactones or inner esters of beta-hydroxy carboxylic acids, may be obtained in good yields by the reaction of a ketene with an aldehyde or ketone. In this manner beta-propiolactone (also called hydracrylic acid lactone) which has the structure

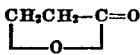

is economically obtained from ketene and formaldehyde.

It is further disclosed in the copending applications of Thomas L. Gresham and Forrest W. Shaver, Serial Nos. 656,167 and 656,168, filed on March 21, 1946, now abandoned, that beta-lactones will react with certain organic compounds containing one or more hydrogen-bearing trivalent nitrogen atoms to form N-substituted carboxylic acid amides.

We have now discovered, surprisingly, that beta-propiolactone will react with the secondary diarylamine, diphenylamine, to form beta-(N,N-diphenyl)-amino propionic acid, this reaction being quite unlike the reactions described in the above-mentioned applications since it involves the linkage of an amino nitrogen atom to the beta carbon atom of beta-propiolactone. This reaction provides a convenient and economical method of preparing beta-(N,N-diphenyl)-amino propionic acid, which has not heretofore been prepared.

The reaction of this invention, leading to the formation of beta-(N,N-diphenyl)-amino propionic acid, is illustrated by the following equation representing the reaction occurring when beta-propiolactone is reacted with diphenylamine:

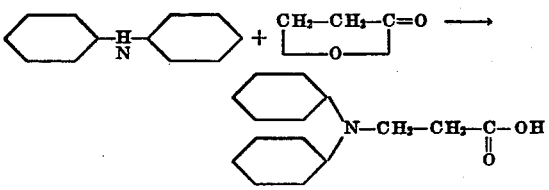

In carrying out the reaction a wide variety of reaction procedures and conditions may be used. When the reaction temperature is above the melting point of diphenylamine, the reaction may be effected simply by mixing the reactants with efficient stirring and then allowing reaction to occur or by adding one of the reactants to the other during the course of the reaction in which event the addition of the beta-propiolactone to the diphenylamine is preferred since the lactone tends to polymerize in the presence of small amounts of basic substances, thereby reducing the quantity of lactone available for the reaction. Another procedure, especially desirable when the reaction is carried out below the melting point of diphenylamine consists in dissolving or dispersing the diphenylamine in a solvent or diluent which does not react appreciably with beta-propiolactone and then adding beta-propiolactone either as such or in solution in the same or a miscible medium. Solvents and diluents useful in this connection include benzene and other hydrocarbons, ether, acetone, toluene, and other natural and substantially inert solvents and the like.

It has been found that a zinc chloride catalyst or other metal chloride catalyst such as aluminum chloride, although not necessary for the completion of the reaction, will accelerate the reaction, this being especially true where a solvent is employed with the reactants.

The temperature at which the reaction is conducted is not critical and may be varied considerably. It has been found that the best yields from this reaction are obtained when temperatures of approximately 140° C. are maintained. However, temperatures from 5° C. to 180° C. have been used with good results, but temperatures above 100° C. and especially from 130 to 150° C. are preferred.

Quantities of reactants are likewise not critical although it is generally desirable to employ equimolecular quantities of the diphenylamine and beta-propiolactone, or a molecular excess of diphenylamine.

The reaction product is obtained as a slightly yellow oil which solidifies on stirring. It is easily purified by crystallization from aqueous alcohol solution and the pure compound is a white solid with a melting point of 111 to 113° C. The purified reaction product has been found to be beta-(N,N-diphenyl)-amino propionic acid.

This new compound, beta-(N,N-diphenyl)-amino propionic acid, formed in the reaction described hereinabove finds utility in diverse fields. It can be used as an intermediate in the preparation of many valuable organic compounds. For example, it may be reacted with alcohols under the usual esterification conditions to produce esters of beta-(N,N-diphenyl)-amino propionic acid.

It has also been shown to be a valuable plant regulant, for example, when 1 to 5% of the compound is dissolved in a solvent such as kerosene, the resulting solution is effective in weed-killing. In addition, it has been found to be especially valuable in the propagation of root systems. For example, ten four-inch rose cuttings were dipped for thirty seconds in an aqueous dispersion containing 0.125 milligrams of beta-(N,N-diphenyl)-amino propionic acid for each c. c. of water present, the dispersions also containing 0.025% by weight of sodium lauryl sulfate (Aquarex D) as dispersing agent. The cuttings were then placed in clean sand along with ten control cuttings. The cuttings were watered daily and after eight days were examined for the extent of rooting. Of the ten cuttings treated with the acid, eight were growing with good root systems while all the untreated cuttings were rotted.

The more detailed preparation of beta-(N,N-diphenyl)-amino propionic acid is illustrated by the following examples, wherein parts are given by weight. There are, of course, many other reaction procedures which are operative other than these specific examples.

Example I 338 parts (2 moles) of diphenylamine are heated to a temperature of 140° C. 72 parts (1 mole) of beta-propiolactone are then added dropwise with constant stirring. Heating is continued until the exothermic reaction starts; the reaction mixture is then added to an excess of 10% sodium hydroxide solution. After cooling, the insoluble, unreacted diphenylamine is filtered from the solution. The filtrate is made acid and upon stirring a white solid is precipitated. The precipitate is crystallized from aqueous ethanol solution and 168 parts (69.5% yield) of beta-(N,N-diphenyl)-amino propionic acid (M. P. 111.5–113° C.) are formed.

Example II 253.5 parts (1.5 moles) of diphenylamine and 72 parts (1 mole) of beta-propiolactone are reacted by adding the beta-propiolactone to the diphenylamine in a dropwise manner without the addition of heat. After the beta-propiolactone is added, the reaction product is added to a mechanically stirred 10% sodium hydroxide solution. The unreacted diphenylamine is filtered off and the filtrate extracted with ether to remove any diphenylamine which remains after the filtering. The extracted filtrate is then acidified with conc. HCl and a white solid precipitates. The precipitate is crystallized from aqueous alcohol solution and 139 parts (57.7% yield) of beta-(N,N-diphenyl)-amino propionic acid (M. P. 110°–113° C.) are formed.

When this example is repeated in the presence of acetone, as solvent for the reactants, and in the presence of 0.5 part of zinc chloride as catalyst, the same compound is again obtained.

We claim:

1. The method which comprises reacting diphenylamine with beta-propiolactone and recovering primarily beta-(N,N-diphenyl)-amino propionic acid.

2. The method which comprises reacting diphenylamine with beta-propiolactone in a mutual solvent and in the presence of a zinc chloride catalyst and recovering primarily beta-(N,N-diphenyl)-amino propionic acid.

3. The method which comprises reacting diphenylamine with beta-propiolactone at a temperature of 130° to 150° C. and recovering primarily beta-(N,N-diphenyl)-amino propionic acid.

THOMAS L. GRESHAM.
RALPH A. BANKERT.

REFERENCES CITED

The following references are of record in the file of this patent:

Basler: Ber. Deut. Chem., vol. 17 (II), page 1503 (1884).

Stolle: Journal der Prakt. Chem., vol. 198, N. F. 90, pages 273–275 (1914). (Beilstein Handbuch der Org. Chem., vol. 12 (supp.) page 264, 4th ed.)